US008244110B2

(12) United States Patent  
Toebes et al.

(10) Patent No.: US 8,244,110 B2  
(45) Date of Patent: Aug. 14, 2012

(54) UPGRADING MEDIA CONTENT QUALITY FOR MEDIA CONTENT BASED ON DETECTING UPGRADED MEDIA PRESENTATION DEVICE

(75) Inventors: John Toebes, Cary, NC (US); Anthony John Wasilewski, Alpharetta, GA (US)

(73) Assignee: Cisco Technology, Inc., San Jose, CA (US)

( * ) Notice: Subject to any disclaimer, the term of this patent is extended or adjusted under 35 U.S.C. 154(b) by 860 days.

(21) Appl. No.: 12/357,236

(22) Filed: Jan. 21, 2009

(65) Prior Publication Data

US 2010/0185673 A1     Jul. 22, 2010

(51) Int. Cl.
*H04N 5/89* (2006.01)
*H04N 5/78* (2006.01)

(52) U.S. Cl. ....................................... 386/336; 386/323

(58) Field of Classification Search .................. 386/262, 386/248, 291, 297, 296, 323, 336, 200
See application file for complete search history.

(56) References Cited

U.S. PATENT DOCUMENTS

| | | |
|---|---|---|
| 6,529,949 B1 | 3/2003 | Getsin et al. |
| 2001/0042048 A1 | 11/2001 | Boykin et al. |
| 2004/0024688 A1 | 2/2004 | Bi et al. |
| 2006/0123455 A1* | 6/2006 | Pai et al. ................. 725/133 |
| 2007/0157234 A1 | 7/2007 | Walker |
| 2007/0195685 A1 | 8/2007 | Read |
| 2008/0141317 A1* | 6/2008 | Radloff et al. .............. 725/87 |

FOREIGN PATENT DOCUMENTS

| | | |
|---|---|---|
| EP | 1 933 317 A1 | 6/2008 |
| WO | WO 03/040893 A2 | 5/2003 |
| WO | WO 2006/067677 A2 | 6/2006 |
| WO | WO 2009/042007 A1 | 4/2009 |
| WO | WO 2010/021852 A1 | 2/2010 |

OTHER PUBLICATIONS

U.S. Appl. No. 12/273,321, filed Nov. 18, 2008, Jouret et al.
Toebes, "Enabling a Richer Video Experience With Metadata", [online], W3C Video on the Web Workshop Dec. 12-13, 2007, [retrieved on Apr. 9, 2008]. Retrieved from the Internet:<URL: http://www.w3.org/2007/08/video/positions/Cisco_MSG.html>, pp. 1-4.
Wikipedia, "Video scaler", [online], Oct. 1, 2008, [retrieved on Oct. 3, 2008]. Retrieved from the Internet: <URL: http://en.wikipedia.org/w/index.php?title=Video_scaler&printable=yes>, pp. 1-5.
"The Netflix Player by Roku", [online], [retrieved on Oct. 6, 2008]. Retrieved from the Internet:<URL: http://www.roku.com/netflixplayer/>, pp. 1-2.

(Continued)

*Primary Examiner* — Robert Chevalier
(74) *Attorney, Agent, or Firm* — Leon R. Turkevich

(57) ABSTRACT

In one embodiment, a method comprises detecting a user selection of media content having a prescribed quality and that is authorized for presentation to the user at the prescribed quality; detecting a media presentation device to be used in presenting the media content to the user; determining, relative to the prescribed quality of the media content, whether a higher-quality version of the media content is available for presentation to the user by the media presentation device; and selectively obtaining, for presentation to the user on the media presentation device, the higher-quality version of the media content based on detecting an authorized purchase of the higher-quality version of the media content to be presented to the user.

23 Claims, 5 Drawing Sheets

OTHER PUBLICATIONS

Falcone, "Hands-on with LG's BD300 Netflix Blu-ray player", [online], Aug. 1, 2008, [retrieved on Oct. 6, 2008]. Retrieved from the Internet:<URL: http://news.cnet.com/8301-17938_105-10004471-1.html>, pp. 1-3.

Wikipedia, "High-definition television", [online], Oct. 2, 2008, [retrieved on Oct. 2, 2008]. Retrieved from the Internet: <URL: http://en.wikipedia.org/w/index.php?title=High-definition_television&printable=tes>, pp. 1-15.

Wikipedia, "High-Definition Multimedia Interface", [online], Oct. 6, 2008, [retrieved on Oct. 6, 2008]. Retrieved from the Internet: <URL: http://en.wikipedia.org/w/index.php?title=High-definition_Multimedia_Interface&printable=yes>, pp. 1-14.

Wikipedia, "High-bandwidth Digital Content Protection", [online], Oct. 4, 2008, [retrieved on Oct. 6, 2008]. Retrieved from the Internet: <URL: http://en.wikipedia.org/w/index.php?title=High-bandwidth_Digital_Content_Protection&printable=yes>, pp. 1-5.

Wikipedia, "DVD", [online], Oct. 2, 2008, [retrieved on Oct. 2, 2008]. Retrieved from the Internet: <URL: http://en.wikipedia.org/w/index.php?title=DVD&printable=yes>, pp. 1-9.

Wikipedia, "DVD-Video", [online], Sep. 27, 2008, [retrieved on Oct. 2, 2008]. Retrieved from the Internet: <URL: http://en.wikipedia.org/w/index.php?title=DVD-Video&printable=yes>, pp. 1-8.

Wikipedia, "Digital video fingerprinting", [online], Dec. 31, 2008, [retrieved on Apr. 10, 2009]. Retrieved from the Internet: <URL: http://en.wikipedia.org/w/index.php?title=Digital_video_fingerprinting&oldid=261137725&printable=yes>, pp. 1-3.

Wikipedia, "Color calibration", [online], Aug. 29, 2008, [retrieved on Oct. 3, 2008]. Retrieved from the Internet: <URL: http://en.wikipedia.org/w/index.php?title=Color_calibration&printable=yes>, pp. 1-4.

Wikipedia, "Blu-ray Disc", [online], Oct. 2, 2008, [retrieved on Oct. 2, 2008]. Retrieved from the Internet: <URL: http://en.wikipedia.org/w/index.php?title=Blu-ray_Disc&printable=yes>, pp. 1-17.

* cited by examiner

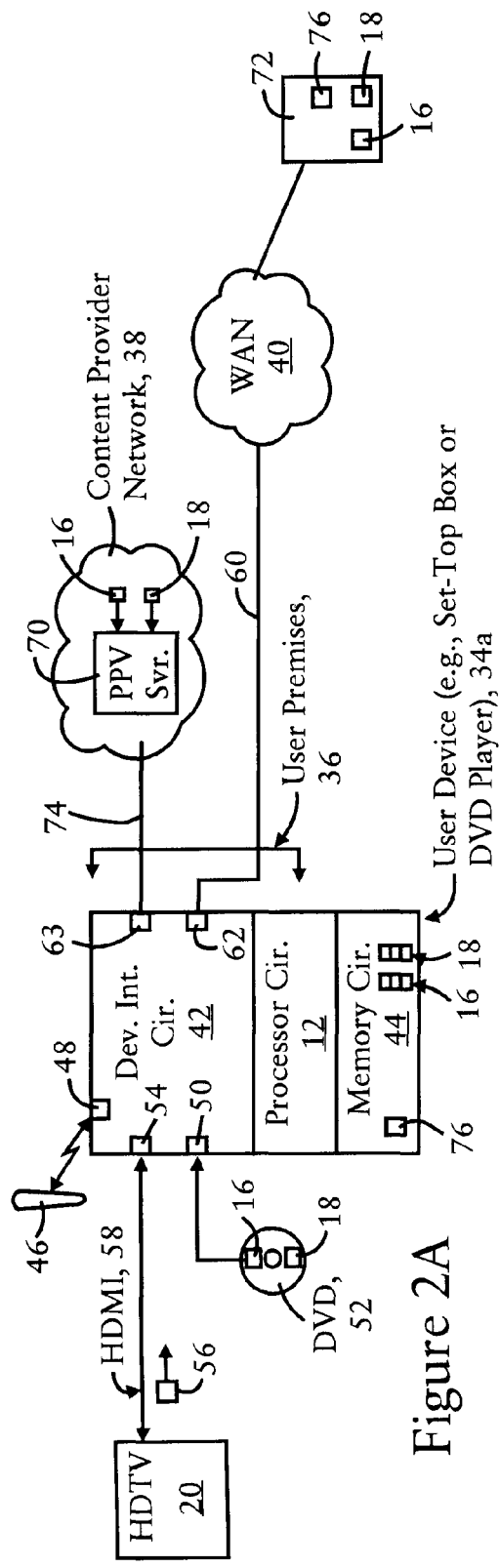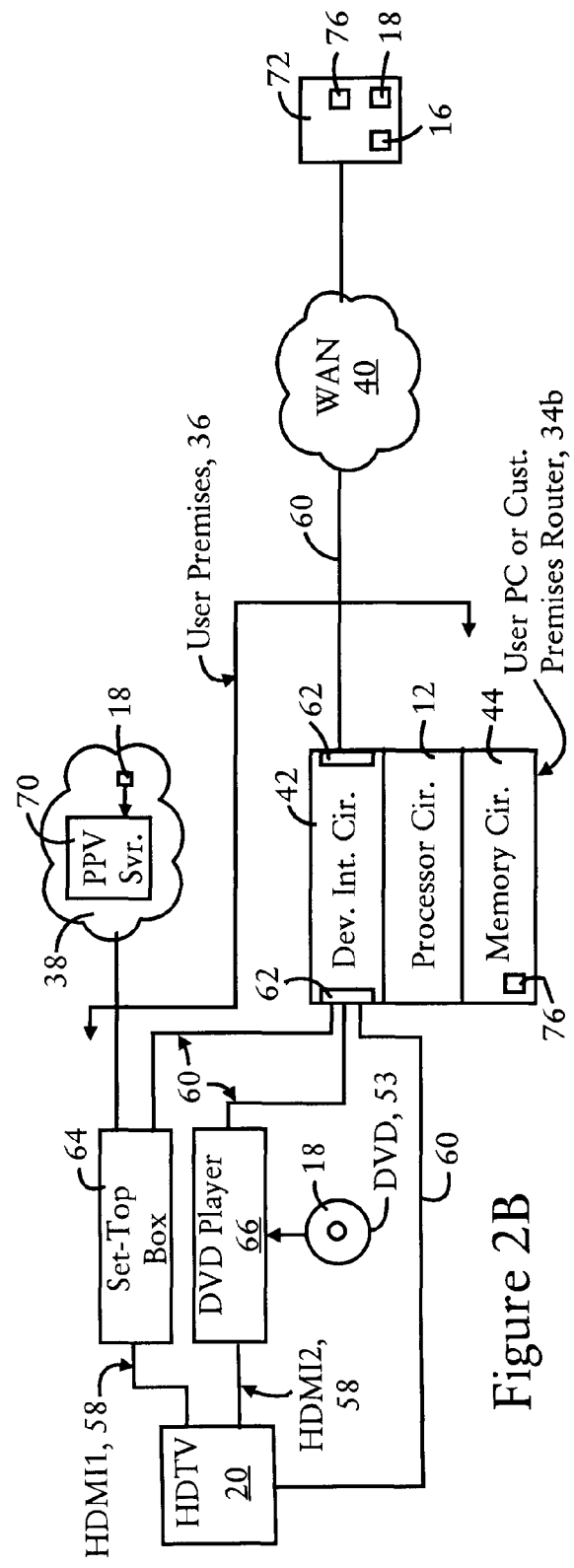
Figure 2A
Figure 2B

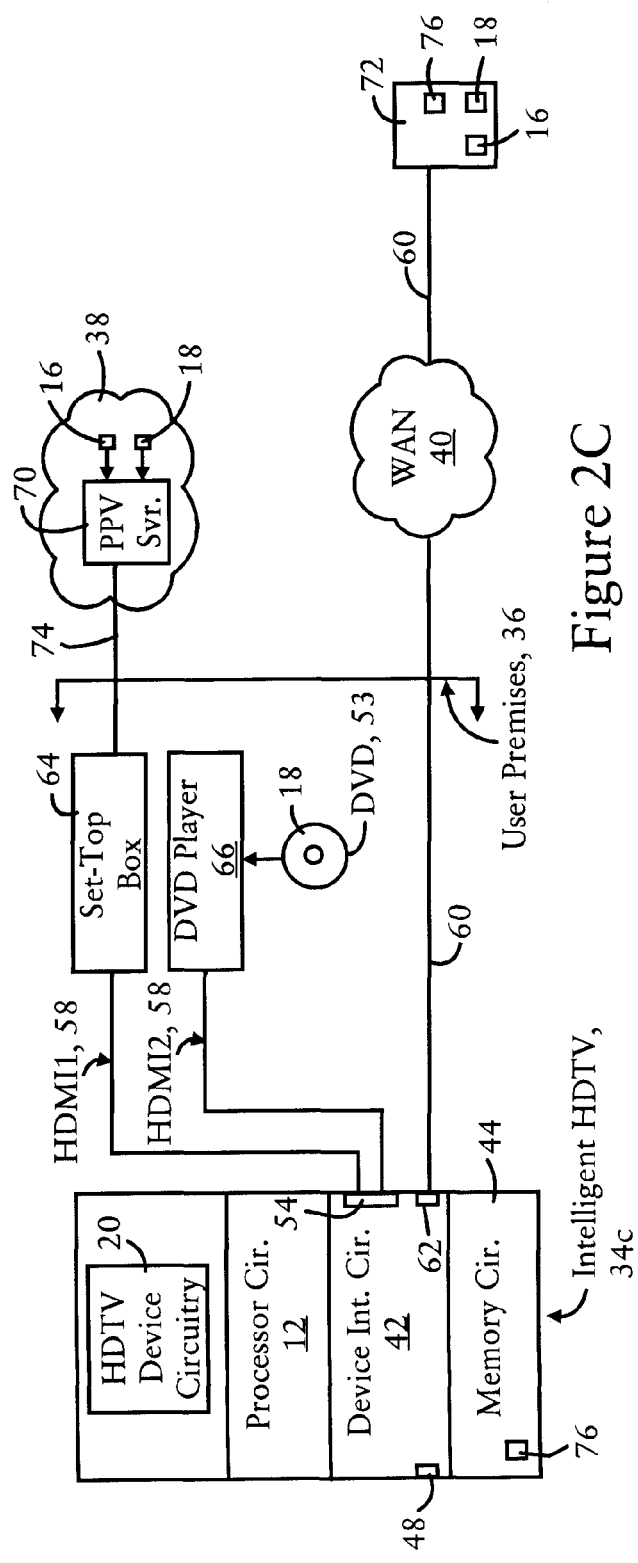
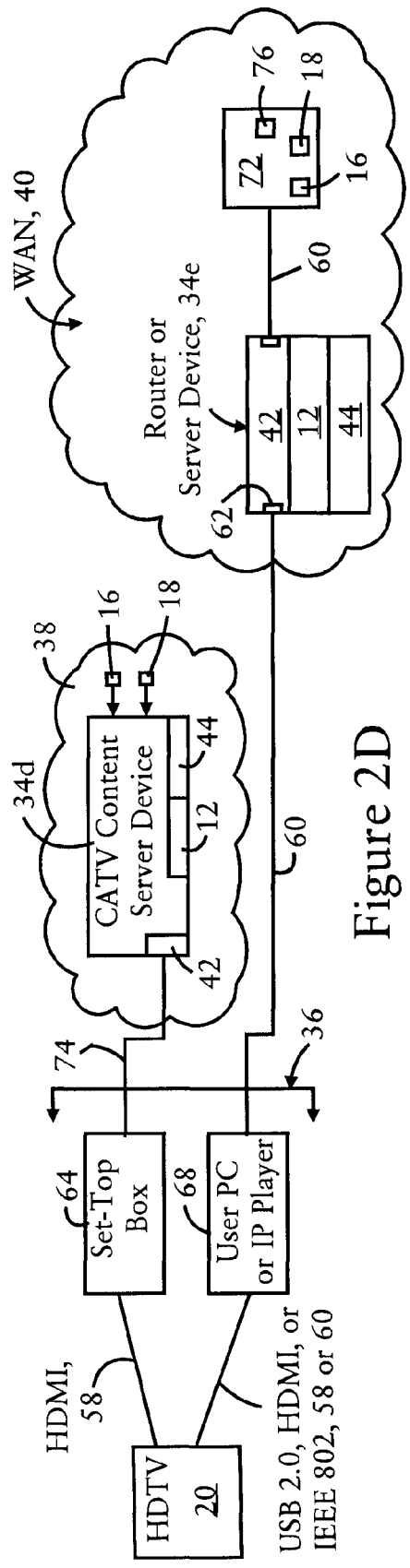
Figure 2C
Figure 2D

UPGRADING MEDIA CONTENT QUALITY FOR MEDIA CONTENT BASED ON DETECTING UPGRADED MEDIA PRESENTATION DEVICE

TECHNICAL FIELD

The present disclosure generally relates to optimizing compatibility between user hardware devices and information stored on tangible machine-readable storage devices. In particular, the present disclosure relates to optimizing presentation of media content on a media presentation device operated by a user.

BACKGROUND

Media content users enjoy the ability to upgrade existing media presentation devices (e.g., television sets, audio sound systems, video display monitors, etc.) to newer systems such as home theater systems that offer higher quality in terms of video quality, audio fidelity, and/or display quality.

Problems arise, however, if the user owns media content that does not have a corresponding quality that enables the user to exploit the enhanced features of the higher-quality media presentation devices. For example, a user having purchased an HDTV set (and a high definition disk drive such as a Blu-Ray disc player) cannot enjoy the full HDTV experience during presentation of media content stored on a conventional DVD (e.g., a movie stored at a resolution of 720× 480 pixels (NTSC) or 720×576 (PAL) and having monaural or two-channel audio). Hence, the only modification typically available to the user is employing video scaler circuitry within the HDTV set or the DVD player to "expand" the stored 720×480 pixel DVD video to fit the 1920×1080 pixel HDTV screen. However, video scaling to incompatible aspect ratios (e.g., 3:2 stored on the DVD to 16:9 on the HDTV) causes distortion by causing individuals to appear either "short and fat" (due to excess horizontal expansion), or cropping of edges of a displayed scene.

Hence, a user is forced to purchase a higher-quality version of the same DVD from the content provider in order to exploit the enhanced features of the higher-quality media presentation device such as the HDTV set and the "5.1" audio system.

Users of personal computers employing web browsers can download different versions of media content for presentation on their personal computers. For example, a user can download a "free" version of a media content item that includes advertising, utilizes a small screen size, and/or presents only a portion of the available content. A user also can choose a "premium" version of the same media content item upon payment of a prescribed fee and which can include extended features, advertisements, and/or offer a full screen size. Users of personal computers also can download different versions of media content based on the available bandwidth for connecting to a media content source, for example a smaller screen size presentation for low bandwidth connections, or a larger screen size presentation for high-bandwidth connections.

BRIEF DESCRIPTION OF THE DRAWINGS

Reference is made to the attached drawings, wherein elements having the same reference numeral designations represent like elements throughout and wherein:

FIGS. 2A-2D illustrate example devices implementing the processor circuit of FIG. 1 for obtaining the higher-quality version of the media content, according to example embodiments.

DESCRIPTION OF EXAMPLE EMBODIMENTS

Overview

Figure 1:
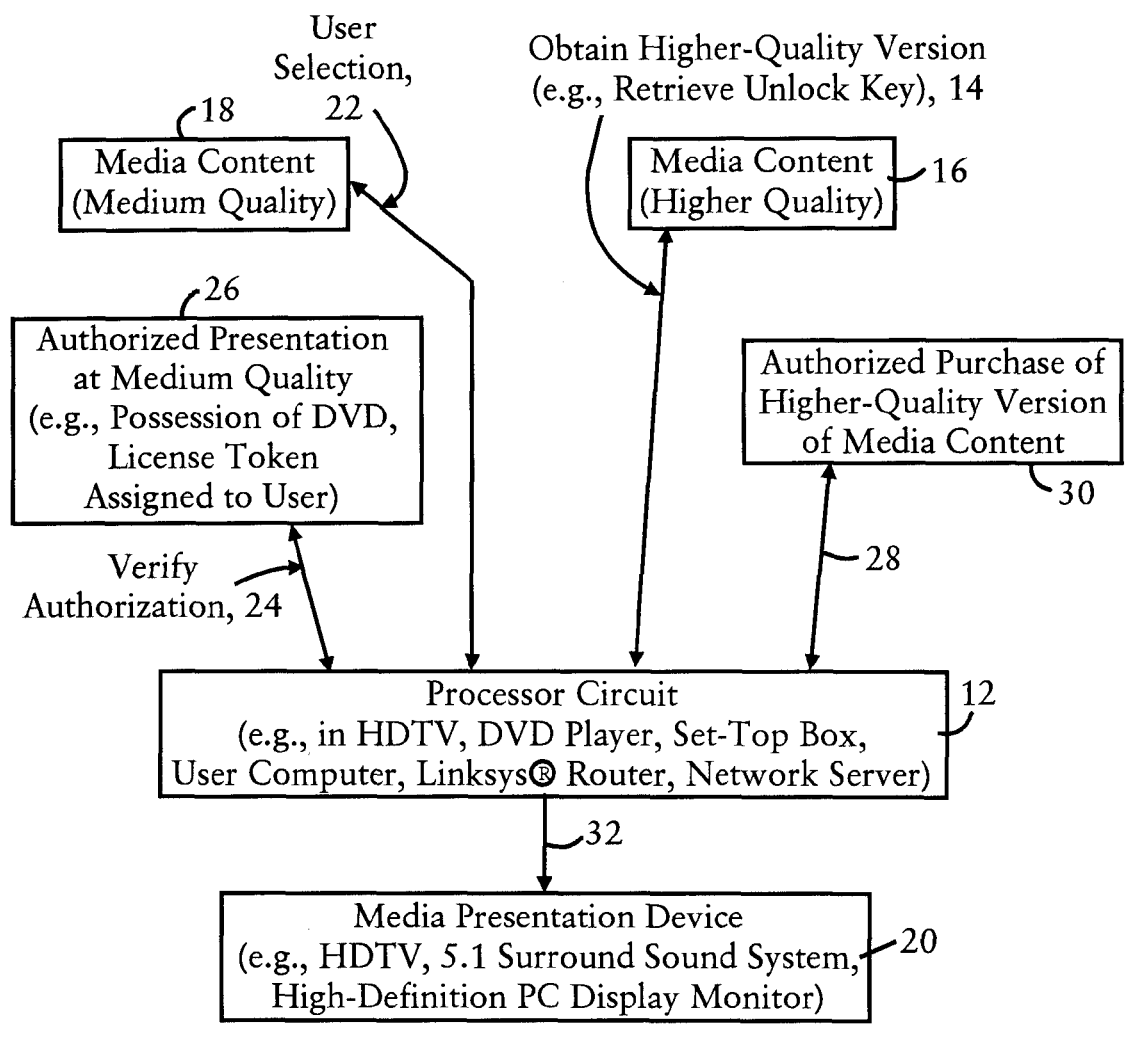
FIG. 1 illustrates an example system having a processor circuit configured for obtaining a higher-quality version of media content, relative to a prescribed quality owned by a user, for optimized presentation of the media content to a user via a media presentation device, according to an example embodiment.

In one embodiment, a method comprises detecting a user selection of media content having a prescribed quality and that is authorized for presentation to the user at the prescribed quality; detecting a media presentation device to be used in presenting the media content to the user; determining, relative to the prescribed quality of the media content, whether a higher-quality version of the media content is available for presentation to the user by the media presentation device; and selectively obtaining, for presentation to the user on the media presentation device, the higher-quality version of the media content based on detecting an authorized purchase of the higher-quality version of the media content to be presented to the user.

In another embodiment, an apparatus comprises a device interface circuit and a processor circuit. The device interface circuit is configured for detecting a user selection of media content having a prescribed quality and that is authorized for presentation to the user at the prescribed quality. The processor circuit is configured for detecting a media presentation device to be used in presenting the media content to the user. The processor circuit further is configured for determining, relative to the prescribed quality of the media content, whether a higher-quality version of the media content is available for presentation to the user by the media presentation device. The processor circuit also is configured for selectively obtaining, for presentation to the user on the media presentation device, the higher-quality version of the media content based on detecting an authorized purchase of the higher-quality version of the media content to be presented to the user.

DETAILED DESCRIPTION

Particular embodiments disclosed herein enable an apparatus to optimize the presentation of media content (i.e., a media content item) to a user on a media presentation device based on selectively obtaining a higher-quality version of the media content, relative to a prescribed quality of the media content owned by the user, at the instance that the user chooses to consume the media content. The particular embodiments optimize the presentation of media content on the media presentation device in response to detecting the user selection of the media content that is authorized for presentation to the user at a prescribed quality: the prescribed quality that is authorized for presentation to the user can be determined by the particular embodiments to be based on a presentation format stored on a DVD owned by the user, or a prescribed quality granted to the user according to a license token assigned to the user and issued by the licensing authority for the media content.

The particular embodiments also can detect the media presentation device to be used in presenting the media content to the user. The particular embodiments can determine, relative to the prescribed quality of the media content that is authorized for presentation to the user, whether a higher-quality version of the media content is available for presentation to the user by the media presentation device. Assuming a higher-quality version of the media content is available for presentation to the user by the media presentation device, the particular embodiments can selectively obtain the higher-quality version of the media content based on detecting an authorized purchase of the higher-quality version of the media content to be presented to the user.

Hence, the particular embodiments enable a user, having a collection of media content items (e.g., a collection of DVDs, online videos, CDs, online music, online images, etc.), to automatically upgrade any one of the media content items to a higher-quality version of the corresponding media content item, enabling the user to enjoy the optimized presentation of the media content on the media presentation device without the necessity of replacing the existing collection of media content items. Further, the particular embodiments ensure the enforcement of digital rights management and licenses granted by licensing authorities for the media content items, based on detecting the ownership of the media content item at the prescribed quality (authorizing presentation of the media content at the prescribed quality), and selectively obtaining the higher-quality version of the media content based on detecting an authorized purchase of the higher-quality version.

FIG. 1 illustrates an example system 10 having a processor circuit 12, according to an example embodiment. The processor circuit 12 is configured for obtaining in step 14 a higher-quality version 16 of media content (i.e., a media content item), relative to a prescribed quality 18 of the media content owned by a user, for optimized presentation of the media content to a user via a media presentation device 20. In summary, the processor circuit 12 can detect a user selection 22 of the media content item having the prescribed quality 18, available locally for example from a prescribed media content source such as a DVD, a movie on a mass storage device at the user premises (e.g., implemented within a customer premises set-top box commercially available from Scientific-Atlanta or TiVo), or available remotely from an identifiable destination via a network connection with a content provider network or an Internet protocol (IP) based wide-area network (e.g., a pay-per-view service offered by a video service provider, TiVo to Go, Netflix instant download, etc.).

The prescribed quality 18 of the media content item as described herein illustrates media content parameters that are insufficient to fully exploit the capabilities of the media presentation device 20. In particular, the prescribed quality 18 of the media content item illustrates media content parameters that are optimized for a media presentation device offering a lower quality presentation that is obsolete relative to the hardware capabilities of the media presentation device 20. In contrast, the higher-quality version 16 of the media content illustrates media content parameters that fully exploit the capabilities of the media presentation device 20. Hence, the higher-quality version 16 of the media content has media content parameters that are superior to the respective media content parameters of the media content having the prescribed quality 18.

The media content parameters that define the relative quality of the prescribed quality 18 of the media content or the higher-quality 16 of the media content can vary depending on the type of media content. For example, if the media content chosen by the user in the user selection 22 represents a digital audio file, then an example of a prescribed quality 18 can be a digital audio file having two-channel (stereo) encoding (e.g., 44.1 kHz, 16 bits, stereo). In contrast, an example of a higher-quality version 16 of the same media content can be a digital audio file providing improved signal-to-noise ratio, a greater dynamic range, and an encoding providing a more "realistic" sound experience, for example encoding for a "5.1" (or "7.1") speaker system utilizing five speakers (or seven speakers) and one subwoofer surrounding a user of the audio system (e.g., 48 kHz, 24 bit variable bit rate, 5.1 or 7.1 channels), or a THX-certified sound system. Examples of improved display quality 16 (e.g., for digital images) can include higher pixel resolution that exploits the ability of a new display monitor to provide more reliable color reproduction (e.g., gamma, white point, color balance) relative to a prescribed color space (e.g., CIELAB or CIEXYZ), as opposed to a display monitor providing less pixel resolution and/or less reliable color reproduction. Examples of "medium" video quality 18 can include a 720×480 pixel video stream, as opposed to a higher-quality video stream 16 providing a frame resolution of 1920×1080 pixel video stream. Hence, a user changing from a standard definition television (SDTV) set (having a frame resolution of 720 horizontal pixels by 480 vertical pixels and an aspect ratio of 3:2) to new media presentation device 20, such as a high-definition television (HDTV) set, will be unable to exploit the features of the new media presentation device 20 using the media content having the "medium" quality 18. An HDTV set (e.g., 1080i) typically has a frame resolution of 1920 horizontal pixels by 1080 vertical pixels (actively-interlaced or progressively scanned), resulting in an aspect ratio of 16:9 (1.78).

Hence, the higher-quality version 16 of the media content is able to fully exploit the enhanced hardware features of the media presentation device 20, whereas the "medium" quality 18 of the media content is incapable of fully exploiting the enhanced hardware features of the media presentation device 20. Consequently, the processor circuit 12, in response to detecting the user selection 22 of the media content having the prescribed quality 18, can selectively obtain the higher-quality version 16 of the same media content. As described in further detail below, the processor circuit 12 can be configured for selectively obtaining in step 14 the higher-quality version 16 based on detecting in step 24 a tangible data structure 26 indicating that the prescribed quality 18 is authorized for presentation to the user, and detecting in step 28 an authorized purchase 30 of the higher-quality version 16 of the media content. The tangible data structure 26 indicating that the user is authorized to be presented with the media content at the prescribed quality 18 can be implemented in the form of a data structure stored on a tangible machine-readable storage medium. For example, the tangible data structure 26 can be implemented as a DVD storing the media content, such that authorization is established based on the user having physical possession of the DVD that stores the media content having the prescribed quality 18. The tangible data structure also can be implemented as a license token that is assigned to the user, illustrated in further detail below with respect to FIG. 4. The detection 28 of the authorized purchase 30 of the higher-quality version 16 of the media content can be implemented, for example, in the form of an upgrade confirmation message that is received from an authorized vendor.

Hence, the processor circuit 12 can obtain in step 14 the higher-quality version 16 of the media content item for presentation in step 32 of the higher-quality version 16 of the media content to the media presentation device 20. The higher-quality version 16 can be obtained in step 14, for example, based on downloading from a prescribed destination the higher-quality media content item (e.g., streaming video implemented in high-definition format) 16, or downloading differential encoding parameters that can be combined (i.e., merged) with the medium quality version 18 in order to enable the processor circuit 12 to dynamically generate the higher-quality version 16. Assuming the higher-quality media content item 16 is stored in a "locked format" (e.g., encrypted) on the same tangible computer readable storage medium (e.g., DVD) that stores the medium-quality media content item 18, the processor circuit 12 also can obtain in step 14 the higher-quality media content item 16 based on retrieving from a prescribed destination an "unlock key" that unlocks the higher-quality media content item 16 from the tangible computer readable storage medium. Other forms of mass storage devices can be used to concurrently store the higher-quality media content item 16 (in locked format) and the medium-quality media content item 18, for example a hard disk drive, a USB memory device, etc.

Hence, the processor circuit 12 enables a user to automatically upgrade the media content owned by the user at a prescribed quality 18 to a higher-quality version 16 in order to optimize the presentation of the media content on a media presentation device 20. As described in further detail below with respect to FIGS. 2A-2D, the processor circuit 12 can be implemented in numerous forms, enabling the automatic upgrading to be executed either locally at the customer premises that contains the media presentation device 20, or remotely from the customer premises containing the media presentation device 20 (i.e., within a network reachable by the customer premises).

FIGS. 2A-2D illustrate example network-enabled devices (i.e., network-enabled machines or network-enabled apparatus) 34 implementing the processor circuit 12 of FIG. 1 for obtaining the higher-quality version of the media content, according to example embodiments. Each of the devices 34 illustrated in FIGS. 2A-2D is implemented as a machine and includes a device interface circuit 42, the processor circuit 12, and a memory circuit 44. Hence, each device 34 includes a device interface circuit 42 configured for detecting a user selection of media content according to the prescribed "medium" quality 18. The device interface circuit 42 for each device 34 may vary, depending on implementation.

FIG. 2A illustrates the processor circuit 12 implemented within a consumer device 34a at the user premises 36 and configured for supplying the medium-quality media content 18, for example as a set-top box or a DVD player. As illustrated in FIGS. 2A and 2C, the device interface circuit 42 of the user devices 34a and 34c can include a remote control interface circuit 48 configured for detecting the user selection in response to receiving a user selection input command from a user input device 46; the device interface circuit 42 of the user device 34a also can include a mass storage device interface circuit 50 configured for receiving a mass storage device, for example a DVD 52 that can store the medium quality content 18 and optionally the higher-quality content 16. The mass storage device interface circuit 50 also can be configured for interfacing with a mass storage device such as an internal or external hard disk drive or a USB memory device.

The device interface circuit 42 of the user device 34a also can include a high-definition multimedia interface (HDMI) circuit 54 configured for receiving sending High-bandwidth Digital Content Protection (HDCP) messages 56 from the HDTV 20 via an HDMI link 58. The HDCP message 56 enables that enable the processor circuit 12 to detect the media presentation device 20 to be used in presenting media content to the user, including determining the capabilities of the media presentation device 20 from metadata in the message 56 that describes the media presentation device 20. Alternately, the HDMI link 58 and the HDMI circuit 54 can be substituted with an Ethernet (IEEE 802.3 or IEEE 802.11) network link 60 and network interface circuit 62, as illustrated in FIG. 2B.

The device interface circuit 42 of the user device 34a also includes a network interface circuit 62 and a content provider interface circuit 63. The network interface circuit 62 and the content provider interface circuit 63 are configured for communicating with respective media content sources 70 and 72 via the content provider network 38 and the wide-area network 40, respectively, depending on implementation. Hence, either the network interface circuit 62 and/or the content provider interface circuit 63 can be utilized for validating the user is authorized for presentation of the media content at the prescribed quality 18, detecting whether an authorized purchase of the higher-quality version 16 has been applied to the user of the media presentation device 20, and/or obtaining the higher-quality version (or at least required components thereof, e.g., unlock key, differential upgrade parameters, etc.) 16.

FIG. 2B illustrates the processor circuit 12 implemented within a network device 34b at the user premises 36, for example a user computer or a customer premises router (e.g., a commercially available Linksys® router modified as described herein) and that is configured for receiving user selection inputs and metadata describing the media presentation device 20 from either a set-top box 64, a DVD player 66, and/or the media presentation device 20. As illustrated in FIG. 2B, the device interface circuit 42 of the user device 34b includes a network interface circuit 62 configured for communication with the set-top box 64, the DVD player 66, the media presentation device 20, and/or the media content source 72 that is reachable via the wide-area network.

According to the example embodiment, the media content source 72 can be a network-based media server device configured for supplying the medium quality media content 18 and/or the higher-quality media content 16, for example based on outputting a media stream according to the appropriate format 16 or 18.

Each of the media content sources 70 or 72 also can serve as licensing authorities for the respective formats 16 and 18, for example online rental services, DVD vendors, or social network sites that allow the storage of license tokens within data structures describing attributes about the users. Hence, the media content sources and 70 or 72 can store on a tangible machine readable storage medium a tangible data structure (also referred to as a "content vault") 76 that stores all the license tokens granted to the user of the media presentation device 20. As illustrated in FIGS. 2A, 2B, and 2C, the processor circuit 12 also can store the content vault 76 in a local computer readable medium, for example the memory circuit 44, a hard disk drive, a USB memory device.

FIG. 2C illustrates the processor circuit 12 implemented within an intelligent high-definition television (iHDTV) 34c, enabling the iHDTV 34c that includes the media presentation device circuitry 20 to automatically upgrade for the user the medium quality media content 18 that is supplied by the set-top box 64 or the DVD player 66. The processor circuit 42 of the iHDTV 34c is able to communicate with a remote media content source 70 (e.g., a content provider pay-perview server device) based on sending messages to the media content source 70 through the connection 74 established via the set-top box 64; alternately, the processor circuit 42 of the iHDTV 34c is able to communicate with the remote media content source 72 via the IP-based connection 60 established by the network interface circuit 62.

FIG. 2D illustrates that the processor circuit 12 can be implemented remotely from the user premises 36, namely within a network device (e.g., a content server device) 34d within a content provider network 38 or a network device (e.g., an access server device or content server device) 34e within an IP-based wide area network (WAN) 40 such as the Internet.

Also note that the devices 34b of FIG. 2B and 34d of FIG. 2D include network interface circuits 62 configured for detecting the media presentation device 20, and the respective capabilities, for example based on receiving the metadata describing the media presentation device 20 within an IP-based message, for example in the form of XML-format metadata tags. Hence, the consumer devices illustrated in FIGS. 2B and 2D, for example the set-top box 64, the DVD player 66, and the user PC or IP-based media player (e.g., the commercially available Netflix Player from Roku at the website address "www.roku.com") 68 can be configured for forwarding user selection information and/or media presentation device metadata to the device 34 for determining whether a higher-quality version of the media content should be retrieved for the media presentation device 20. Hence, both the devices 34b, 34d and 34e can monitor the user inputs and the capabilities of the media presentation device 20 to determine whether a higher-quality media content 16 should be offered to the user, based on the user selecting the media content having the "medium" quality 18.

Any of the disclosed circuits of the devices 34 (including the processor circuit 12, the device interface circuit 42, the memory circuit 44, and their associated components) can be implemented in multiple forms. Example implementations of the disclosed circuits include hardware logic that is implemented in a logic array such as a programmable logic array (PLA), a field programmable gate array (FPGA), or by mask programming of integrated circuits such as an application-specific integrated circuit (ASIC). Any of these circuits also can be implemented using a software-based executable resource that is executed by a corresponding internal processor circuit such as a microprocessor circuit (not shown), where execution of executable code stored in an internal memory circuit (e.g., within the memory circuit 44) causes the processor circuit 12 to store application state variables in processor memory, creating an executable application resource (e.g., an application instance) that performs the operations of the circuit as described herein. Hence, use of the term "circuit" in this specification refers to both a hardware-based circuit that includes logic for performing the described operations, or a software-based circuit that includes a reserved portion of processor memory for storage of application state data and application variables that are modified by execution of the executable code by a processor circuit. The memory circuit 44 can be implemented, for example, using a non-volatile memory such as a programmable read only memory (PROM) or an EPROM, and/or a volatile memory such as a DRAM, etc.

Further, any reference to "outputting a message" or "outputting a packet" (or the like) can be implemented based on creating the message/packet in the form of a data structure and storing that data structure in a tangible memory medium in the disclosed apparatus (e.g., in a transmit buffer). Any reference to "outputting a message" or "outputting a packet" (or the like) also can include electrically transmitting (e.g., via wired electric current or wireless electric field, as appropriate) the message/packet stored in the tangible memory medium to another network node via a communications medium (e.g., a wired or wireless link, as appropriate) (optical transmission also can be used, as appropriate). Similarly, any reference to "receiving a message" or "receiving a packet" (or the like) can be implemented based on the disclosed apparatus detecting the electrical (or optical) transmission of the message/packet on the communications medium, and storing the detected transmission as a data structure in a tangible memory medium in the disclosed apparatus (e.g., in a receive buffer). Also note that the memory circuit 23 can be implemented dynamically by the processor circuit 22, for example based on memory address assignment and partitioning executed by the processor circuit 22.

Figure 3A:
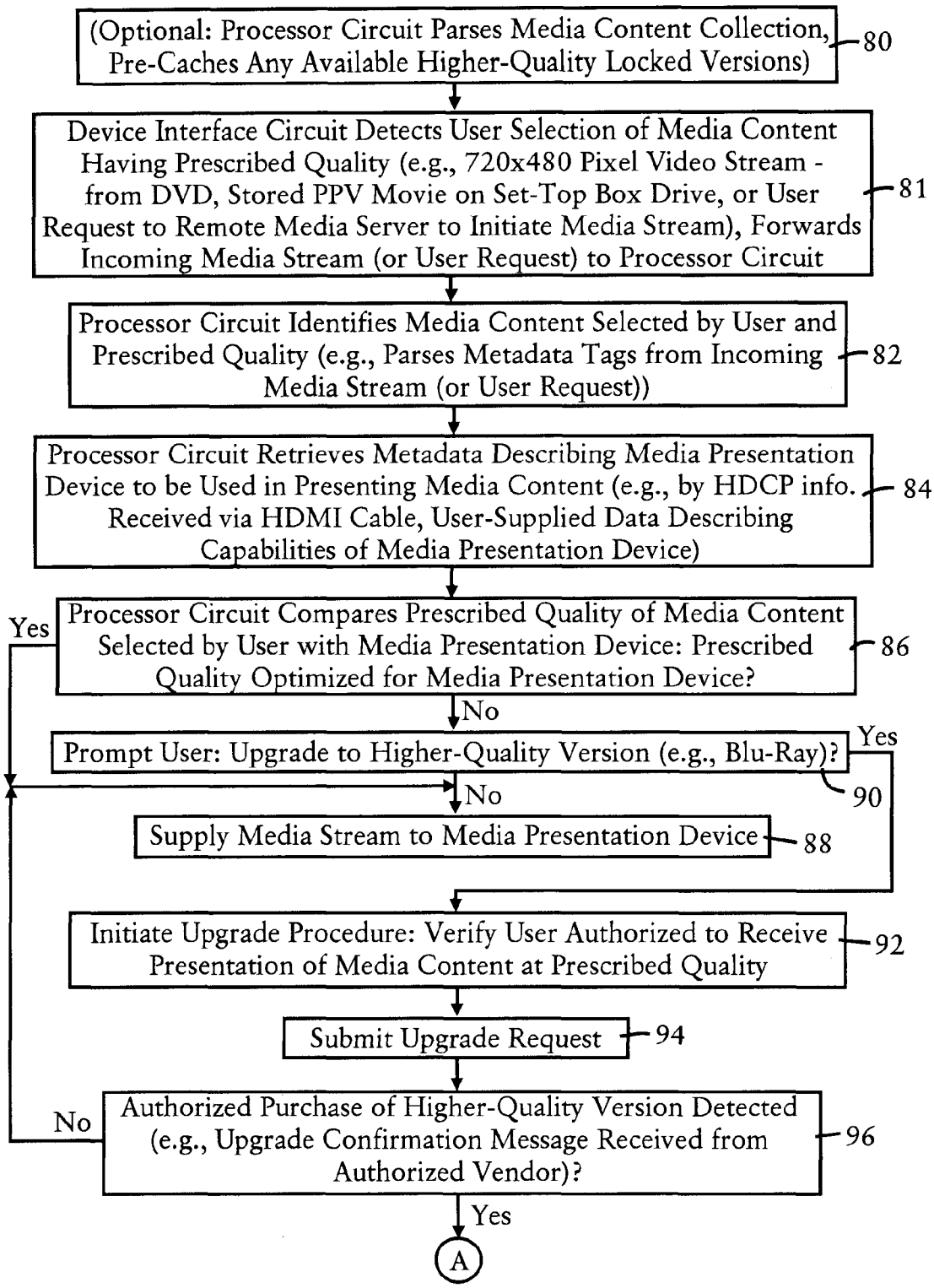
FIGS. 3A and 3B summarize an example method by the processor circuit, implemented in any one of the devices of FIGS. 2A-2D, of obtaining the higher-quality version of the media content, according to an example embodiment.
Figure 3B:
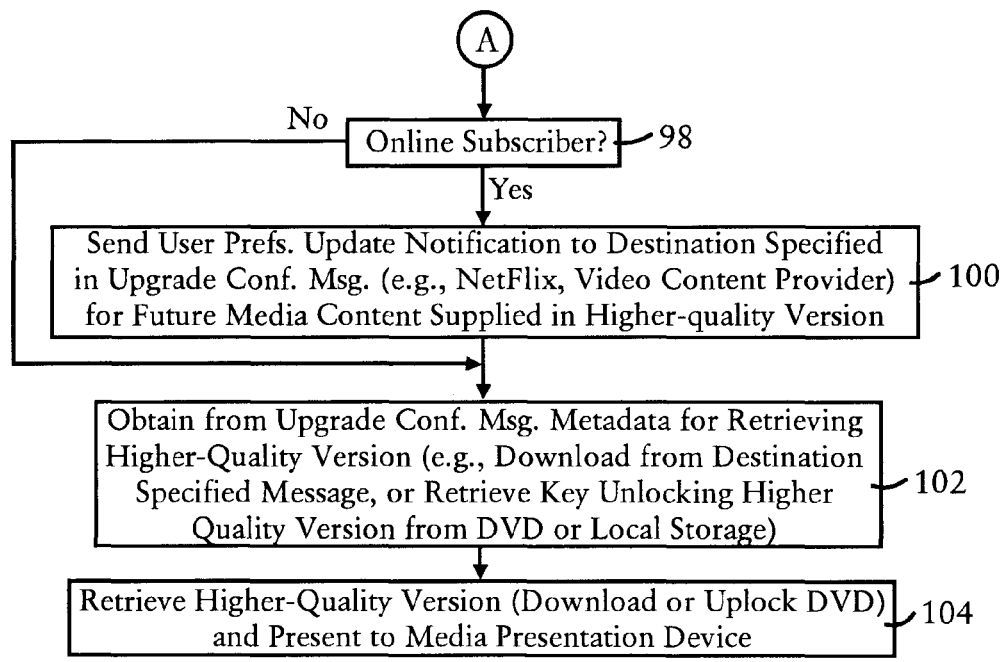

FIGS. 3A and 3B summarize an example method by the processor circuit, implemented in any one of the devices of FIGS. 2A-2D, of obtaining the higher-quality version of the media content, according to an example embodiment.

The steps described in FIGS. 3A and 3B can be implemented as executable code stored on a tangible computer readable storage medium (e.g., floppy disk, hard disk, ROM, EEPROM, nonvolatile RAM, CD-ROM, etc.) that are completed based on execution of the code by a processor circuit; the steps described herein also can be implemented as executable logic that is encoded in one or more tangible media for execution (e.g., programmable logic arrays or devices, field programmable gate arrays, programmable array logic, application specific integrated circuits, etc.).

The processor circuit 12 optionally can detect and parse in step 80 the collection of media content items owned by the user and in response create (locally or remote) the content vault 76 that identifies the media content items owned by the user. For example, the processor circuit 12 can detect the availability of the prescribed-quality media content items 18 stored in the user premises on the different user devices, including the set-top box 34a (illustrated in FIG. 2A), the user computer 34b, mass storage devices (e.g., hard disk drives), and DVDs 52 or 53 stored for example in a DVD player configured for storing a collection of DVDs. The processor circuit 12 also can retrieve and store ("pre-cache") in step 80 any available higher-quality versions 18 in any appropriate device at the same user premises 36 as the media presentation device 20. As illustrated in FIG. 2A, the higher-quality versions 18 can be pre-cached by the processor circuit 12 in the memory circuit 44. The pre-cached higher-quality versions 18 can remain locked until purchased by the user. Hence, the processor circuit 12 can specify within the content vault 76, for a given media content item, the location of the prescribed quality media content item 18, the license token (or location of the license token), the location of the higher-quality media content item 16 (stored locally or remotely), whether the higher-quality media content item 16 is locked, and whether the user owns a license token and/or unlock key for accessing the higher-quality media content item 16.

Referring to step 81 of FIG. 3A, the device interface circuit 42 detects a user selection of media content (i.e., a media content item) having a prescribed quality 18, also referred to as a "medium" quality 18. For example, the device interface circuit 42 can detect user selection of an identifiable video stream having a prescribed quality 18 of a 720×480 pixel size: the device interface circuit 42 can detect the user selection, for example, in response to detecting a DVD 52 or 53 inserted by the user into either mass storage device interface 50 of the user device (e.g., 34a), or into another DVD player device 66 configured for supplying the media content having the prescribed quality 18 to the media presentation device 20. As illustrated in FIGS. 2B and 2C, the DVD 53 inserted into the conventional DVD players and 66 has only the selected media content at the medium quality 18; in contrast, the DVD 52 inserted into the user device 34a includes both the medium quality version 18 and the higher-quality version 16 of the same selected by the user, except that it is assumed that the higher-quality version 16 of the media content is initially "locked" or "hidden", and therefore unavailable to the user of the HDTV 20.

The user selection of the media content having the medium quality 18 also can be detected from a pay-per-view movie stored on a mass storage device within the user device 34a of FIG. 2A, or the set-top box 64 of FIGS. 2B-2D. In this example, the detection of the pay-per-view movie by the device interface circuit 42 can be based on the device interface circuit 42 monitoring the set-top box 64 (as in the case of the device 34b, 34d, or 34e). The device interface circuit 42 of the device 34a, 34b, 34c, and 34d also can detect a user request for retrieval of the media content 18 from an identifiable destination (e.g., 70, 72) via a network connection, where the device interface circuit 42 monitors requests passed between the user interface device (e.g., 46) and the identifiable destination (e.g., 70, 72).

The device interface circuit 42 of the device 34c in FIG. 2C also can detect the user request for retrieval of the media content 18 based on the device interface circuit 42 receiving the video stream at the medium quality 18 from the video source (e.g., the set-top box 64 or the DVD player 66).

The device interface circuit 42 in step 81 forwards all incoming media streams or user requests to the processor circuit 12.

The processor circuit 12 in step 82 identifies the media content selected by the user (e.g., by title, catalog number, etc.) and the corresponding prescribed quality 18. The prescribed quality 18 of the media content selected by the user can be identified, for example, based on parsing the user request, metadata tags within the user request, or metadata tags embedded within the media content item, where the metadata tags describes the media content and the corresponding prescribed medium quality 18. The metadata tags describing the media content and the corresponding prescribed quality 18 also can be stored in the content vault 76 that is stored locally at the user premises 36 (illustrated in FIGS. 2A, 2B, and 2C) or remotely at a server device 72 providing media content services (FIGS. 2A-2D). The processor circuit 12 also retrieves in step 84 metadata that describes the media presentation device 20 to be used in presenting the media content to the user. As described previously, the metadata describing the media presentation device 20 can be obtained by HDCP information received via an HDMI cable 58, or based on user-supplied data that describes the capabilities of the media presentation device (e.g., the user registering the media presentation device 20 with the device 34 in response to a query from the device 34).

The processor circuit 12 compares in step 86 the metadata describing the prescribed quality 18 of the media content selected by the user with the metadata describing the media presentation device 20: the processor circuit determines in step 86 whether the prescribed quality 18 is optimized for the media presentation device 20. If the prescribed quality is already optimized for the media presentation device to be used (e.g., if the media presentation device is another conventional television at the user premises 36), the processor circuit 12 causes the media content at the prescribed quality 18 to be supplied in step 88 to the conventional media presentation device.

If in step 86 the processor circuit 12 determines that the media content at the prescribed quality 18 is not optimized for the media presentation device (e.g., the HDTV) 20, the processor circuit 12 sends a prompt in step 90 to the user, inquiring whether the user wishes to upgrade to the higher-quality version 16. Assuming in step 90 that the user wishes to upgrade to the higher-quality version 16, the processor circuit 12 initiates in step 92 (step 24 of FIG. 1) the upgrade procedure based on verifying that the user is authorized to receive the presentation of the media content at the prescribed quality 18. In other words, the processor circuit 12 first determines in step 92 whether there exists tangible data structure 26 indicating that the user has an authorized license to be presented with the media content at the prescribed quality 18. Additional details with respect to step 92 are described below with respect to FIG. 4.

The processor circuit 12 can submit in step 94 an upgrade request for the higher-quality version 16 of the media content to an identifiable destination, for example the media content server devices 70 or 72. It should be noted that multiple pricing tiers for the upgraded higher-quality media content 16 can be provided based on whether ownership of the medium quality media content 18 can be validated. For example, a lowest-price can be offered for upgrading to the higher-quality version 16 based on validating ownership of the medium quality version 18; a medium price can be offered to a user that does not have a validated ownership but who has a subscription to a rental service that offers the medium quality version 18; a highest price can be offered to a user that does not have any validated ownership of the medium quality version 18 or any valid subscription to a rental service that offers the medium quality version 18.

In addition, the processor circuit 12 may automatically submit the upgrade request without user intervention, for example based on prescribed user preferences requesting automatic upgrading to the higher-quality 16 with authorization to charge a credit account established with the media content server devices 70 or 72, either by the user of the media presentation device 20 or a third-party offering the upgrade as a gift or a promotional offer.

Alternately, the upgrade request can be submitted independently by the user and distinct from the device 34.

The processor circuit 12 determines in step 96 whether the device interface circuit 42 has detected an authorized purchase of the higher-quality version 16 for the user, either as an acknowledgment of the purchase by the user, or an acknowledgment of a gift from a third-party or a promotional offer. For example, the processor circuit 12 can determine in step 96 whether an upgrade confirmation message has been received from an authorized vendor (e.g., 70 or 72) of the higher-quality version 16 of the media content source. As described below with respect to step 102, the upgrade confirmation message can include metadata that enables the processor circuit 12 to obtain the higher-quality version 16 of the media content item.

Assuming in step 98 that the user of the media presentation device 20 is an online subscriber for media content at the medium quality 18, for example having a online rental account (e.g., "Netflix.com") or an online DVD purchase account (e.g., "Amazon.com" or "TotalVid.com"), the processor circuit 12 can send in step 100 a user preferences update notification message to a destination specified in the upgrade confirmation message received in step 96, requesting that future media content be supplied to the user according to the higher-quality version 16. Hence, assuming the user selection was based on the user inserting a DVD 52 or 53 that was supplied by the content provider 72 (e.g., "Netflix.com"

or "Amazon.com"), the processor circuit 12 can send the user preferences update notification message in step 100 to ensure that future media content is supplied according to the higher-quality version 16.

The processor circuit 12 obtains in step 102 (step 14 of FIG. 1) the metadata from the upgrade confirmation message for retrieving the higher-quality version 16, and retrieves in step 104 the higher-quality version 16 for presentation to the user on the media presentation device 20. For example, the processor circuit 12 can retrieve the higher-quality version 16 locally from a pre-cached location, or remotely from an identifiable destination (e.g., 70 or 72) via a network connection 60 or 74; alternately, the processor circuit 12 can obtain in step 104 differential information that enables the processor circuit 12 to synthesize the higher-quality version 16 based on emerging the differential information with the medium quality version 18. Alternately, the processor circuit 12 can obtain in step 104 a key that unlocks the "locked" or "hidden" higher-quality version 16 from a mass storage device, for example the DVD 52 or memory circuit 44 of FIG. 2A.

Hence, the example embodiments enable a user to be automatically upgraded with a higher-quality version 16 of media content based on detecting the user selection of the media content having the prescribed quality 18, and determining that the higher-quality version 16 is available for presentation to the user by the media presentation device 20.

Figure 4:
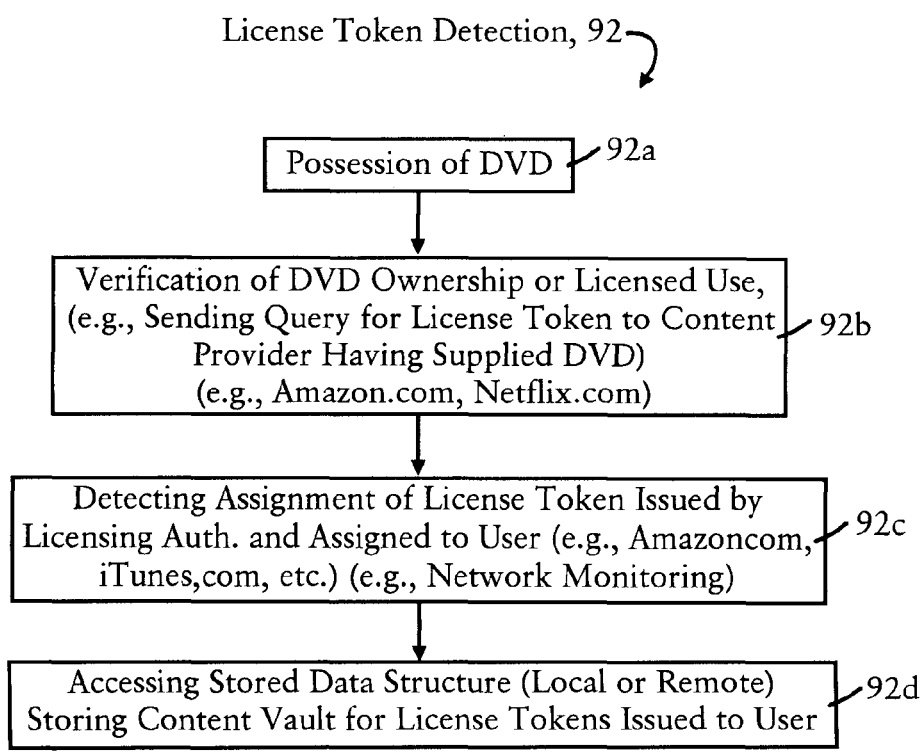
FIG. 4 illustrates example license token detection techniques by the processor circuit, according to an example embodiment.

FIG. 4 illustrates example techniques for detecting in step 92 whether the user is authorized for presentation of the media content at the medium quality 18. For example, the processor circuit 12 can determine that the user is authorized for presentation of the media content at the prescribed quality 18 in response to detecting in step 92a the DVD 52 or 53 inserted by the user into the device 34a or the DVD player 66, and that contains the medium quality 18. In one embodiment, mere possession by the user of the DVD 52 or 53 can be deemed sufficient to establish the user is authorized for presentation of the media content at the prescribed quality.

The processor circuit 12 also can verify the ownership of the DVD 52 or 53, or determine that use of the media content at the medium quality 18 is licensed, based on sending a query for the corresponding license token to a content provider 72 having supplied the DVD 52 or 53 (e.g., an online vendor such as "Amazon.com" or an online rental service such as "Netflix.com"). The query can be sent in step 92b in response to the user selection in step 81, or independent of the user selection as part of identifying all license tokens that have been assigned to the user.

The license tokens also can be detected in step 92c based on network monitoring (e.g., "sniffing") by the processor circuit 12 of network activity between the user devices requesting licenses and the responses by the content providers (i.e., licensing authorities) that assign the licenses to the user. Hence, the processor circuit 12 can monitor and record the assignment of license tokens to the user for respective media content items.

The license tokens also can be detected in step 92d based on the processor circuit 12 accessing a stored data structure, locally or remotely, that stores the content vault 76 specifying the license tokens that are issued to the user.

According to the example embodiments, media content items can be automatically upgraded from a prescribed version 18 licensed to the user, to a higher-quality version 16 based on detecting that a higher-quality version of the media content is available for presentation on an upgraded media presentation device. The example embodiments not only enable a user to more easily upgrade his or her library of media content to exploit the capabilities of the media presentation device, the example embodiment also enable content providers to provide a more effective upgrade procedure, enabling an "upsell" of content that improve revenue streams for existing content as upgraded versions 16 are available.

While the example embodiments in the present disclosure have been described in connection with what is presently considered to be the best mode for carrying out the subject matter specified in the appended claims, it is to be understood that the example embodiments are only illustrative, and are not to restrict the subject matter specified in the appended claims.

What is claimed is:

1. A method comprising:
    detecting a user selection of media content owned by the user at a prescribed quality, the ownership of the media content authorizing presentation of the media content to the user at the prescribed quality;
    detecting a capability of a media presentation device to be used in presenting the media content to the user;
    determining, relative to the prescribed quality of the media content and the capability of the media presentation device, whether an upgrade to a higher-quality version of the media content is available for presentation to the user by the media presentation device; and
    selectively upgrading the media content owned by the user, for presentation to the user on the media presentation device, the higher-quality version of the media content based on detecting an authorized purchase of the upgrade to the higher-quality version of the media content to be presented to the user.

2. The method of claim 1, wherein the detecting of the user selection includes detecting a DVD inserted by the user into a device configured for supplying the media content having the prescribed quality to the media presentation device.

3. The method of claim 2, wherein the selectively obtaining includes at least one of retrieving the higher-quality version of the media content from an identifiable destination via a network connection, or retrieving a key for unlocking the higher-quality version from the DVD, in response to detecting the authorized purchase.

4. The method of claim 3, further comprising sending, to the identifiable destination, a user preferences update notification indicating a user preference for future media content to be supplied to the user according to the higher-quality version, the identifiable destination having supplied the DVD to the user.

5. The method of claim 1, wherein the detecting of the user selection includes detecting that the user is authorized for presentation of the media content at the prescribed quality based on detecting a license token assigned to the user and issued by a licensing authority for the media content.

6. The method of claim 5, wherein the detecting of the user selection includes detecting a user request for retrieval of the media content having the prescribed quality from an identifiable destination via a network connection.

7. The method of claim 5, wherein the detecting of the license token includes at least one of:
    sending a query for the license token to a content provider identified as providing the media content to the user at the prescribed quality;
    detecting the assignment of the license token to the user; or
    accessing a stored data structure configured for storing respective license tokens for respective media content items owned by the user, including the media content having the prescribed quality.

8. The method of claim 1, further comprising retrieving, and storing at a user premises containing the media presentation device, the higher-quality version of the media content in response to detecting availability of the media content having prescribed quality, the selectively obtaining including unlocking the higher-quality version stored at the user premises.

9. An apparatus comprising:
    a device interface circuit configured for detecting a user selection of media content owned by the user at a prescribed quality, the ownership of the media content authorizing presentation of the media content to the user at the prescribed quality; and a processor circuit configured for detecting a capability of a media presentation device to be used in presenting the media content to the user, the processor circuit further configured for:

determining, relative to the prescribed quality of the media content and the capability of the media presentation device, whether an upgrade to a higher-quality version of the media content is available for presentation to the user by the media presentation device; and selectively upgrading the media content owned by the user, for presentation to the user on the media presentation device, the higher-quality version of the media content based on detecting an authorized purchase of the upgrade to the higher-quality version of the media content to be presented to the user.

10. The apparatus of claim 9, wherein the device interface circuit is configured for detecting a DVD inserted by the user for supplying the media content having the prescribed quality to the media presentation device.

11. The apparatus of claim 10, wherein the processor circuit is configured for retrieving the higher-quality version of the media content from an identifiable destination via a network connection, or retrieving a key for unlocking the higher-quality version from the DVD, in response to detecting the authorized purchase.

12. The apparatus of claim 11, wherein the processor circuit is configured for sending, via the device interface circuit and to the identifiable destination, a user preferences update notification indicating a user preference for future media content to be supplied to the user according to the higher-quality version, the identifiable destination having supplied the DVD to the user.

13. The apparatus of claim 9, wherein the processor circuit is configured for detecting that the user is authorized for presentation of the media content at the prescribed quality based on detecting a license token assigned to the user and issued by a licensing authority for the media content.

14. The apparatus of claim 13, wherein the processor circuit is configured for detecting the user selection based on detecting a user request for retrieval of the media content having the prescribed quality from an identifiable destination via a network connection.

15. The apparatus of claim 13, wherein the processor circuit is configured for detecting the license token based on at least one of:

the processor circuit sending a query for the license token to a content provider identified as providing the media content to the user at the prescribed quality;

the processor circuit detecting the assignment of the license token to the user; or the processor circuit accessing a stored data structure configured for storing respective license tokens for respective media content items owned by the user, including the media content having the prescribed quality.

16. The apparatus of claim 9, wherein the device interface circuit is configured for detecting the media content having the prescribed quality from a mass storage device locally reachable by the device interface circuit, the device interface circuit configured for selectively supplying to the media presentation device one of the media content having the prescribed quality or the higher-quality version of the media content, based on detection of the authorized purchase.

17. The apparatus of claim 9, wherein:

the apparatus includes the media presentation device;

the device interface circuit configured for detecting the user selection of media content at the prescribed quality based on receiving metadata describing the media content having the prescribed quality from a media content source, the processor circuit configured for selectively obtaining, via the device interface circuit, the higher-quality version of the media content.

18. The apparatus of claim 9, wherein the apparatus is implemented as a network device configured for detecting the user selection having been transmitted by the user via a user input device towards an identified media content server device, the processor circuit configured for updating the request to specify the higher-quality version of the media content in response to detecting the authorized purchase, for output by the device interface circuit to the identified media content server device.

19. The apparatus of claim 9, wherein the processor circuit is configured for retrieving, and storing at a user premises containing the media presentation device, the higher-quality version of the media content in response to detecting availability of the media content having the prescribed quality, the selectively obtaining including unlocking the higher-quality version stored at the user premises.

20. A non-transitory computer storage medium having logic encoded therein for execution and when executed operable for:

detecting a user selection of media content owned by the user at a prescribed quality, the ownership of the media content authorizing presentation of the media content to the user at the prescribed quality;

detecting a capability of a media presentation device to be used in presenting the media content to the user;

determining, relative to the prescribed quality of the media content and the capability of the media presentation device, whether an upgrade to a higher-quality version of the media content is available for presentation to the user by the media presentation device; and selectively upgrading the media content owned by the user, for presentation to the user on the media presentation device, the higher-quality version of the media content based on detecting an authorized purchase of the upgrade to the higher-quality version of the media content to be presented to the user.

21. An apparatus comprising:

a device interface circuit configured for detecting a user selection of media content owned by the user at a prescribed quality, the ownership of the media content authorizing presentation of the media content to the user at the prescribed quality; and means for detecting a capability of a media presentation device to be used in presenting the media content to the user, the means for detecting further configured for:

determining, relative to the prescribed quality of the media content and the capability of the media presentation device, whether an upgrade to a higher-quality version of the media content is available for presentation to the user by the media presentation device, and selectively upgrading the media content owned by the user, for presentation to the user on the media presentation device, the higher-quality version of the media content based on detecting an authorized purchase of the upgrade to the higher-quality version of the media content to be presented to the user.

22. The computer storage medium of claim 20, wherein the detecting of the user selection includes detecting a DVD inserted by the user into a device configured for supplying the media content having the prescribed quality to the media presentation device.

23. The apparatus of claim 21, wherein the device interface circuit is configured for detecting a DVD inserted by the user for supplying the media content having the prescribed quality to the media presentation device.

\* \* \* \* \*